Nov. 25, 1947.  R. C. TOWNSEND  2,431,436
TRAILER
Filed May 17, 1944  4 Sheets-Sheet 1
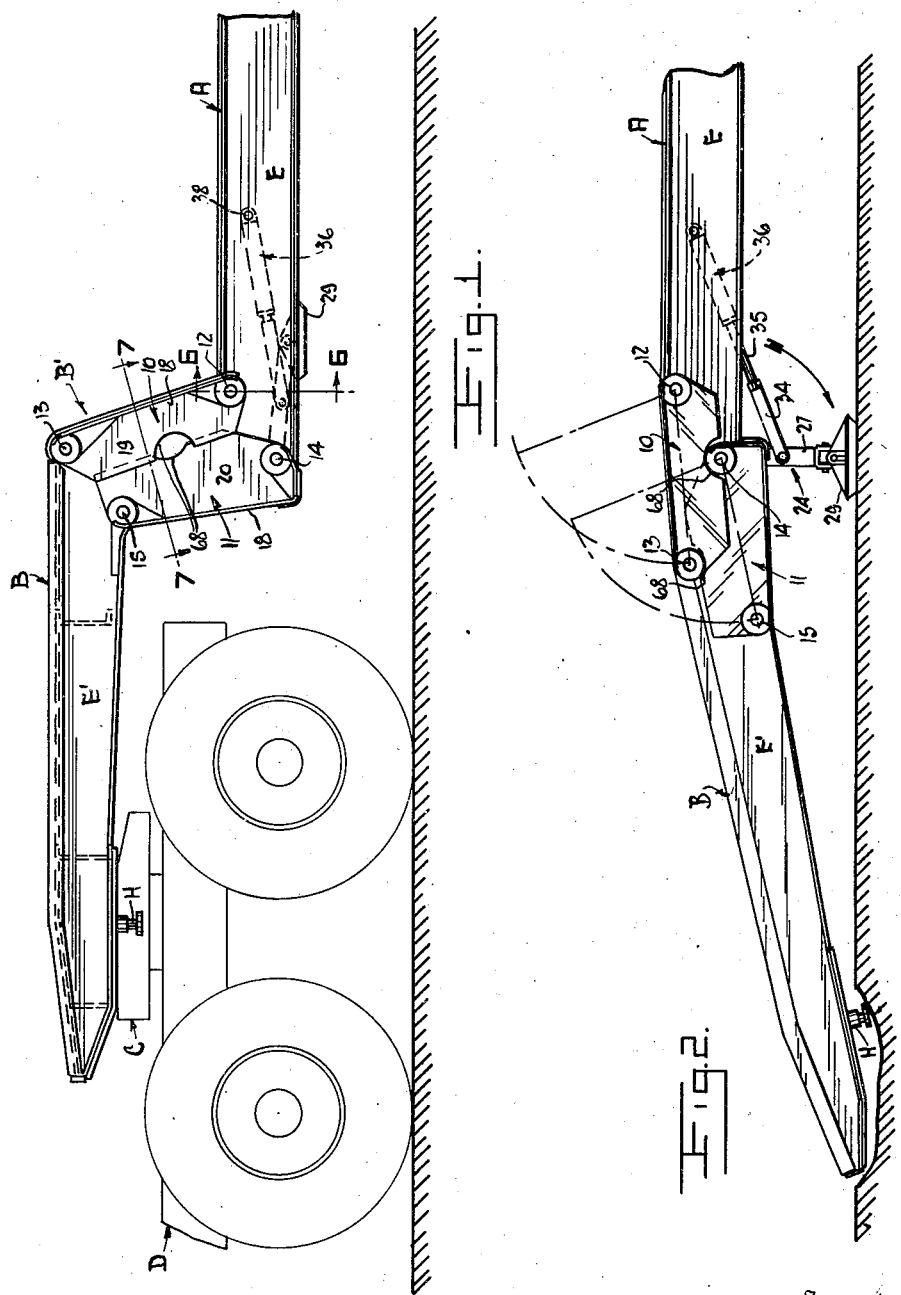
Inventor
ROY C. TOWNSEND
By Carlsen & Hagle
Attorneys Nov. 25, 1947.  R. C. TOWNSEND  2,431,436
TRAILER
Filed May 17, 1944   4 Sheets-Sheet 2
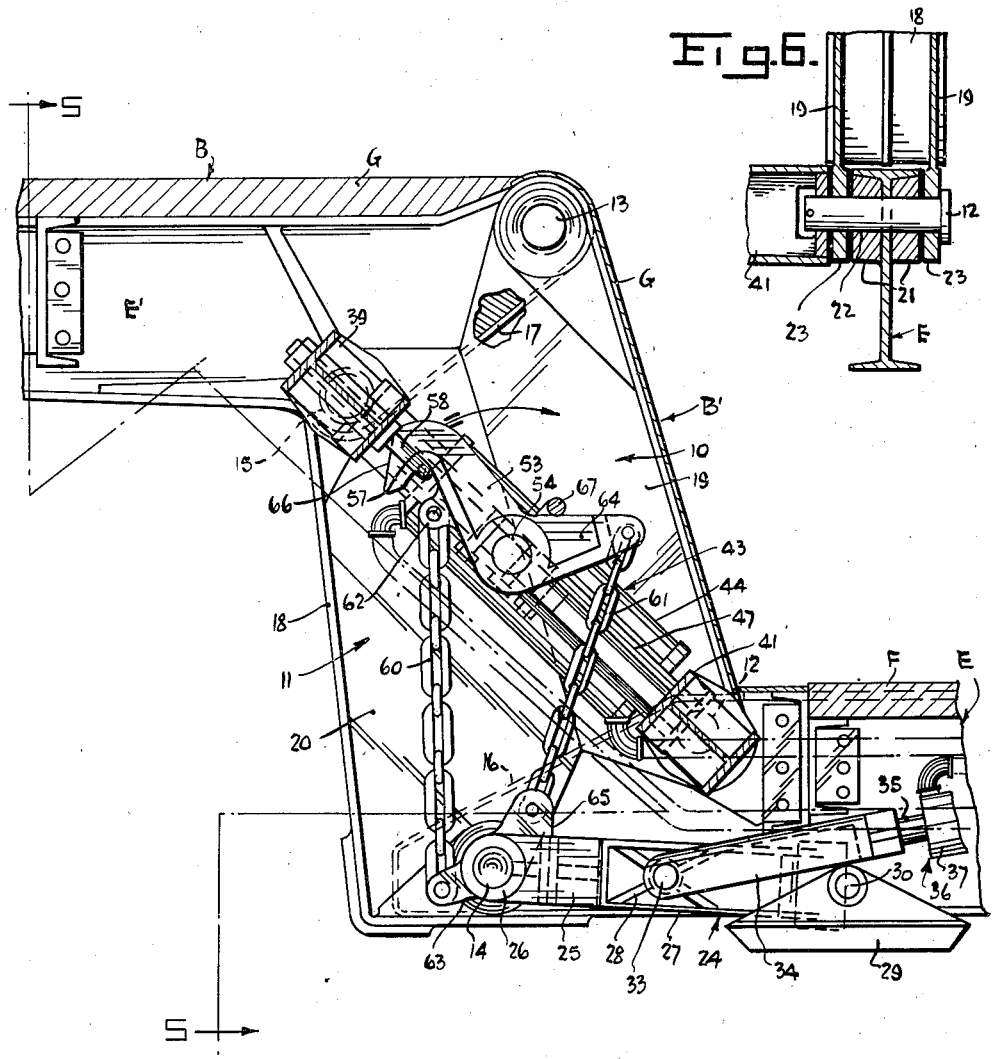
Fig. 6.
Fig. 3.
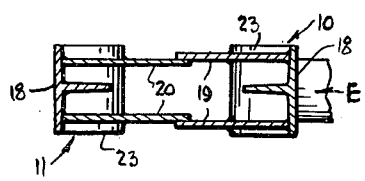
Fig. 7.
Inventor
Roy C. Townsend
By Carlsen + Hage
Attorneys

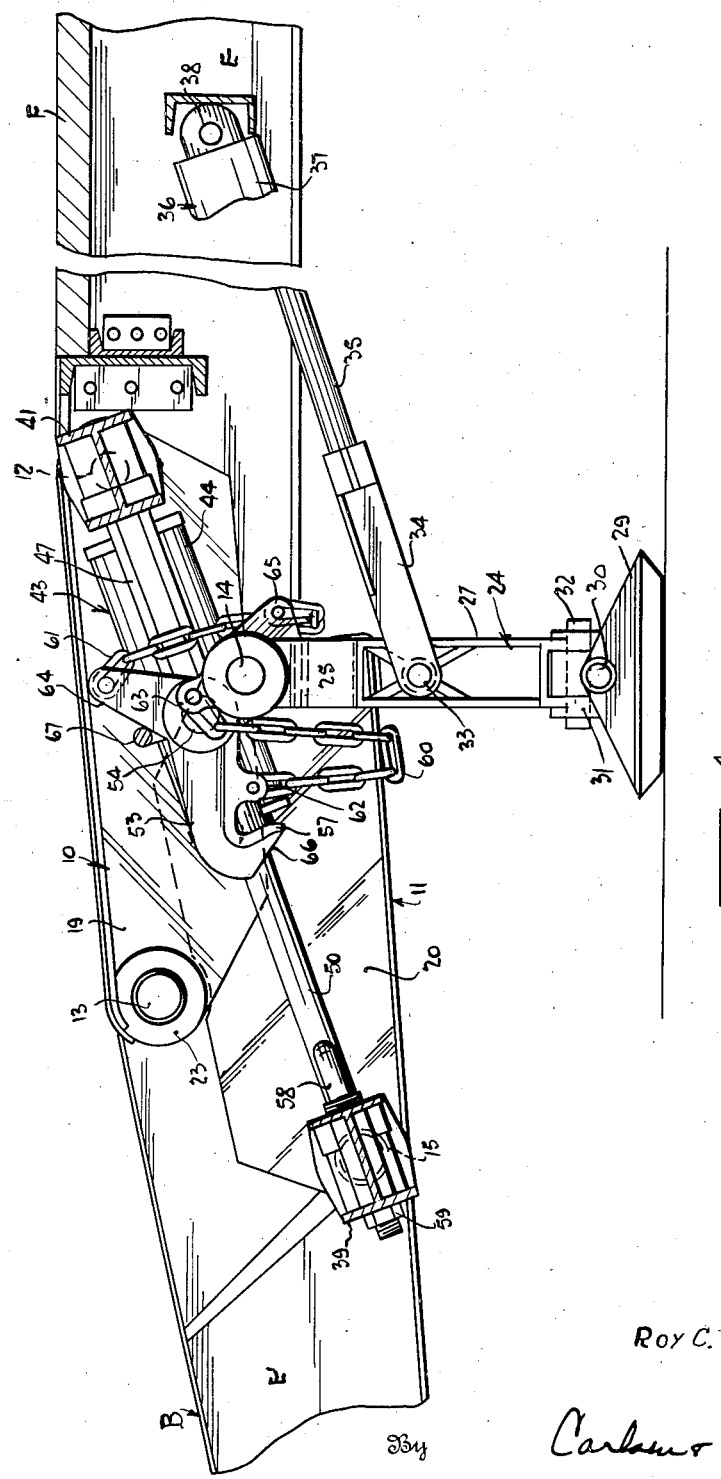

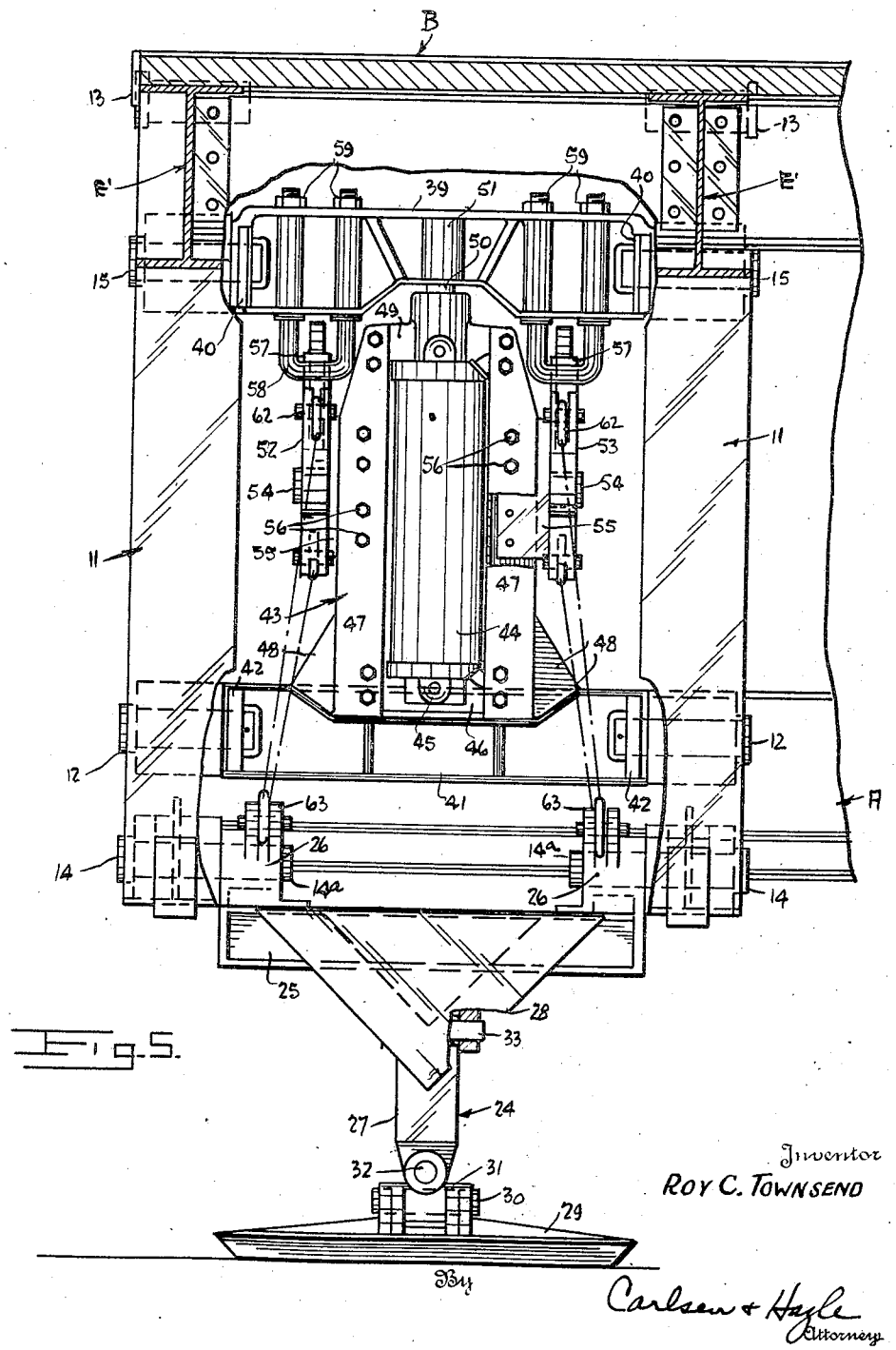

Patented Nov. 25, 1947

2,431,436

UNITED STATES PATENT OFFICE 2,431,436

TRAILER

Roy C. Townsend, La Crosse, Wis., assignor to La-Crosse Trailer Corporation, a corporation of Wisconsin Application May 17, 1944, Serial No. 535,943

16 Claims. (Cl. 280—33.1)

This invention relates generally to improvements in trailers and more particularly to an improved combination frame and cargo loading ramp structure for semi-trailers.

The usual heavy duty or cargo trailer, of the semi-trailer type, has a forward kick-up or gooseneck extension which is supported on and makes draft connection to the tractor or towing truck. Loading is usually accomplished by a portable ramp laid down from the rear end of the platform, but this is a difficult job in many cases and requires an extra heavy part, i. e., the ramp, which is not always conveniently available.

It is the primary object of my invention to provide a forward frame structure for such trailers which may be readily lowered to form a loading ramp over which the trailer may be conveniently loaded. Another object is to provide a combination forward frame structure and loading ramp which is extremely practical, strong and durable and in which not only is the weight employed to normally hold the frame in proper shape during transport but wherein safe locking means is provided and effective power means is arranged for both raising and lowering the frame when it is used as a ramp. Still another and important object is to provide a combination frame structure of this nature wherein the parts, during transport, are arranged to properly transmit the heavy draft forces in a mechanically correct manner. Another object is to provide improved locking means for holding the frame in transport position, and automatic means for releasing the locking means when the frame is to be lowered for loading.

These and other more detailed and specific objects will be disclosed in the course of the following specification, reference being had to the accompanying drawings, in which—

Fig. 1 is a side view of the forward end portion of a semi-trailer constructed in accordance with my invention and showing the same in transport position connected to the tractor or towing truck.

Fig. 2 is a similar view but showing the frame lowered for use as a loading ramp.

Fig. 3 is an enlarged vertical and longitudinal sectional view through a portion of the frame, in transport position.

Fig. 4 is a similar view with the frame lowered.

Fig. 5 is a vertical cross sectional view taken substantially along the line 5—5 in Fig. 3, showing one side portion of the frame, but showing the support means for the frame in a lowered position.

Figs. 6 and 7 are enlarged fragmentary sectional views along the lines 6—6 and 7—7 in Fig. 1.

Referring now more particularly and by reference characters to the drawing, A designates generally the main or platform frame of a semi-trailer, the same being supported at the rear end by the usual wheels (not shown) and having a kick-up or gooseneck extension B at its forward end by which it is conventionally connected to and supported by the fifth wheel mechanism C of the tractor or towing truck indicated at D in Fig. 1. In usual fashion the frame A comprises longitudinal beams E upon which is provided the platform as indicated at F in Figures 3 and 4, and the gooseneck B is decked over as indicated at G.

In the usual trailer of this type it is customary to load it over a removable portable ramp (not shown) laid down from the rear end of the platform and over which heavy equipment may be rolled up to and upon the trailer. In accordance with my invention I eliminate the necessity for the loading ramp, by providing for raising and lowering the kick-up or gooseneck extension B to act when lowered as an inclined extension over which the load may be moved onto the platform, as will now be described.

Each longitudinal beam E has pivoted thereto at its forward end, terminating at the start of the upwardly offset part B' of the gooseneck, a pair of link acting frame arms or swinging frame members 10 and 11, and the opposite ends of these arms or links are pivotally attached to rear ends of shorter beams E' which form longitudinally extending frame parts of the normally horizontal part of the gooseneck. Ordinarily the beams E' are integral extensions of the beams E joined thereto by offsets to provide the necessary clearance beneath the gooseneck to receive the tractor D as will be understood, but in the present case the beams are separate, longitudinally aligned parts joined by the links 10 and 11 aforesaid. The beams E' carry the usual king pin H by which detachable connection is made to the fifth wheel mechanism C of the tractor D.

Inasmuch as the respective links 10 and 11 for each beam are duplicates only one pair will be herein described in detail.

The link 10 is pivotally connected at a lower, rear end by a pin 12 to an upper portion of the beam E and is similarly connected at its other end by another pin 13 to an upper portion of the rear end of beam E'. The link 11 is similarly pivotally attached at its lower or rear end to the forward end of the beam E by a pin 14 and at its other end is similarly attached by a pin 15 to the rear end of the beam E'. It will be noted that the pivots 14 and 15 for the link 11 are disposed in forwardly and downwardly spaced relation to the corresponding pivots 12 and 13 for the link 10 and that the links 10 and 11 as they swing will have a parallel motion effect.

The forward end of the beam E is cut off angularly as designated at 16 in Fig. 3 at a forwardly and downwardly sloping angle, while the rear end of the beam E' is cut off at a rearwardly and upwardly extending angle as seen at 17, to thus correspond to the location of the respective pivots 12—14 and 13—15.

The links 10 and 11, as best seen in Fig. 7 are formed with main sections or "back bones" 18 of T-section structural steel to which are welded parallel sides or flanges. These sides are indicated at 19 for the link 10 and at 20 for the link 11 and are so spaced that they just nicely clear and overlap each other in order to permit the links to swing about their pivots while providing for lateral stiffening of the structure. As shown in Fig. 6 the beam E is provided with bearings or bosses 21 welded to each side and pierced with transverse apertures 22 to clear the pivot pin 12, the sides 19 of the link 10 being arranged to straddle these bosses and being provided themselves with apertured bearings 23 to pass the pin. The same structure is used for making the connections at the pivots 13, 14, and 15 as will be understood.

Between each adjacent pair of the beam structures, of which there are usually two pairs at each side of the trailer and one of which is shown in Fig. 5, I provide a "landing gear" or support means for the forward end of the trailer, as designated generally at 24. Each such support comprises a transverse strut member 25 having bearings 26 at its ends pivotally engaging the extended ends 14a of two adjacent pivot pins 14 to swing thereabout in an upright longitudinal plane. Secured to the center of the strut member 25 and extending at right angles therefrom is a leg 27 which is rigidly braced as indicated at 28 and to the free end of this leg is attached a foot member or ground plate 29. The member 29 is pivoted by a transversely extending pin 30 to a coupling member 31 which in turn is pivoted by a pin 32 to the end of the leg 27, and the pin 32 being disposed at right angles to pin 30 so that the foot member has in effect a universal joint connection to the leg. Intermediate its ends the leg 27 carries a transversely extending pin 33 to which is pivoted the forward end of a yoke or fork 34 forming a rigid extension of the plunger 35 of a hydraulic jack 36. The rear end of the cylinder 37 of this jack 36 is pivotally attached at 38 to the trailer between the beams E rearwardly of the gooseneck offset B'. Fluid for operating the jack 36, to extend or retract plunger 35 is provided in any suitable and well known manner, and the mechanism for this purpose is accordingly not detailed herein. Normally the plunger 35 is retracted and pulls the leg 27 rearwardly and upwardly about pivots 14 to a rearwardly extending transport position (Figs. 1 and 3) so that the foot member 29 hangs between the beams E. However, by extending the jack plunger, the leg may be swung downwardly and forwardly to an upright position (Figs. 2 and 4) to bring the foot member 29 into position to bear upon the ground and support the forward end of the trailer when the tractor D is removed. The universal joint described, connecting the leg 27 and foot member 29 enables the latter to accommodate itself to any irregularities in the surface upon which it rests.

Above each support 24 I provide a raising and lowering mechanism for actuating the links 10 and 11. Each such mechanism comprises a horizontal strut member 39 which extends transversely between the adjacent pair of pivot pins 15 and which is pivotally attached or mounted at its ends on such pins, as indicated at 40 in Fig. 5. A similar strut 41 is extended between adjacent pivot pins 12 and is likewise pivotally attached thereto at 42, also as seen in Fig. 5. A hydraulic ram or jack 43 is arranged between the struts 39 and 41 and the cylinder 44 thereof is rigidly affixed to the rear or lower strut 41 by an ear 45 pinned to a bracket 46 extending between parallel side bars 47 which are spaced apart to receive the cylinder therebetween. These side bars 47 are channel shaped and are welded or rigidly braced to the struts 41 as indicated at 48, and at their opposite ends are connected by a casting 49 which holds the cylinder 44 in place and slidably passes the plunger 50 of the jack. The extended end of the plunger 50 is secured within an apertured boss 51 formed at the center of the strut 39.

The cylinder is supplied with fluid under pressure at either end by any suitable means and obviously when such fluid is admitted to the lower or rear end of the cylinder the plunger 50 will be extended therefrom exerting a thrust between the pivots 12 and 15. On the other hand, the admission of fluid to the upper or forward end of the cylinder will draw plunger 50 inward, exerting a pull between these points. The manner in which the fluid is thus supplied to the cylinder is unimportant to this disclosure and is accordingly not detailed herein.

In operation of the structure as thus far described, and assuming the trailer to be ready for loading, the supports 24 are first lowered by admitting fluid to the jacks 36 to swing the legs 27 downwardly and forwardly as heretofore described. The tractor D is then uncoupled and driven away, leaving the forward end of the trailer supported by supports 24. Fluid is then admitted to the cylinders 44 to extend the plunger 50 and the resulting thrust exerted on the pivot 15 will swing the gooseneck extension B downwardly and forwardly as indicated in Figs. 2 and 4. In this operation links 10 and 11 swing about their pivots 12 and 14 until substantially straightened out and the action continues until gooseneck extension B is brought to rest upon the ground. When thus arranged the platform of the gooseneck B and the decking of link arms 10 form a smoothly and gradually inclining ramp over which the trailer may be readily loaded as will be understood. When the trailer is loaded it is restored to transport condition by admitting fluid to the opposite ends of the cylinder 44, whereupon the plunger 50 is drawn inwardly and the points 15 are pulled upwardly and rearwardly to again raise the gooseneck B to a level permitting its connection to tractor D. In this operation the links 10 and 11 are swung upwardly and rearwardly to restore the offset B' to its initial position. With the trailer then supported upon the tractor D the supports 24 are again pulled upwardly and rearwardly to running position by actuating the jack 36. It will be readily appreciated that the foregoing operations may be carried out rapidly and conveniently and with far less trouble than with the use of the portable loading ramp.

joined to the forward end of the trailer by an offset portion and adapted to be attached to a towing unit, said offset portion including swingable frame members pivotally attached at their ends between the forward end of the trailer and rear end of said gooseneck extension in such manner that said extension may be lowered from an elevated transport position to the ground to act as a loading ramp, and means connecting the said frame members for swinging them and for locking them in transport position, said connecting means also acting as means for transmitting draft forces from the gooseneck extension to the trailer through said offset portion.

4. In a trailer structure of the character described and including a gooseneck extension joined to the forward end of the trailer by an offset portion and adapted to be attached to a towing unit, the said offset portion including pairs of swingable arm members operative to swing the gooseneck extension from an elevated transport position downwardly to the ground for use as a loading ramp, each pair of arms being pivotally attached by four pivots to and between the rear end of the gooseneck extension and forward end of the trailer, and longitudinally extensible and retractable means extending between and connecting a diagonally opposite pair of said pivots for swinging the arm member to raise and lower the gooseneck extension.

5. In a trailer structure of the character described and including a gooseneck extension joined to the forward end of the trailer by an offset portion comprising pairs of swingable arm members operative to swing the gooseneck extension from an elevated transport position downwardly to the ground for use as a loading ramp, the arm members of each pair being arranged one forwardly of the other and attached at their ends by separate pivots to the gooseneck extension and forward end of the trailer, and means connected between the pivot connection of the forward arm member to the extension and the pivot connection of the rear arm member to the trailer for urging these pivots apart to lower the extension or for drawing them together to a definite spacing for holding the extension at transport level.

6. In a trailer structure of the character described and including a gooseneck extension joined to the forward end of the trailer by an offset portion comprising pairs of swingable arm members operative to swing the gooseneck extension from an elevated transport position downwardly to the ground for use as a loading ramp, the arm members of each pair being arranged one forwardly of the other and attached at their ends by separate pivots to the gooseneck extension and forward end of the trailer, and longitudinally adjustable power means connected between a diagonally opposite pair of the pivots for swinging the arm members and raising and lowering the gooseneck extension.

7. In a trailer structure of the character described and including a gooseneck extension joined to the forward end of the trailer by an offset portion and adapted to be attached to a towing unit, the said offset portion including pairs of swingable arm members operative to swing the gooseneck extension from an elevated transport position downwardly to the ground for use as a loading ramp, the arm members of each pair being arranged to swing in the same upright plane and being connected at their respective ends by separate pivots to the rear end of the gooseneck extension and forward end of the trailer, the pivots for each end of one arm member being located in spaced relation forwardly and downwardly of the corresponding pivots for the other, and means connected between the lower pivot on the gooseneck extension and upper pivot at the trailer for swinging the arms.

8. The combination with a trailer having a forward extension adapted to be raised and lowered, of a swingable offset structure for connecting the trailer and extension, comprising pairs of arms with an arm of each pair arranged forwardly of the other and pivotally connected at their ends to and between said extension and trailer to swing in upright planes with respect to the latter and raise and lower said extension, the arms being so positioned that a pivot connection of one moves away from a pivot connection of the other as the extension is lowered and moves toward said connection as the extension is raised, and longitudinally adjustable power means connected between said pivot connections.

9. The combination with a trailer having a forward extension adapted to be raised and lowered, of a swingable offset structure for connecting the trailer and extension, comprising separate pairs of arms with an arm of each pair arranged forwardly of the other and pivotally connected at their ends to and between said extension and trailer to swing in upright planes with respect to the latter and raise and lower said extension, the arms being so positioned that a pivot connection of one moves away from a pivot connection of the other as the extension is lowered and moves toward said connection as the extension is raised, and longitudinally adjustable power means connected between said pivot connections, said power means being operative to urge said connections apart and draw them toward each other, and to limit the latter movement to positively limit upward movement of the said forward extension relative to the trailer.

10. The combination with a trailer having a gooseneck forward extension adapted to be raised and lowered, of a swingable offset structure for connecting the trailer and extension, comprising arms pivotally connected at their ends to and between said extension and trailer to swing in upright planes with respect to the latter and raise and lower said extension, the arms being so positioned that a pivot connection of one moves away from a pivot connection of the other as the extension is lowered and moves toward said connection as the extension is raised, longitudinally adjustable power means connected between said pivot connections, said power means being operative to urge said connections apart and draw them toward each other, and to limit the latter movement to positively limit upward movement of the gooseneck extension relative to the trailer, and separate releasable means for limiting separating movement of said pivot connections independently of said power means.

11. The combination with a trailer having a forward extension adapted to be raised and lowered, of a swingable offset structure for connecting the trailer and extension, comprising arms pivotally connected at their ends to and between said extension and trailer to swing in upright planes with respect to the latter and raise and lower said extensions, the arms being so positioned that a pivot connection of one moves away from a pivot connection of the other as the extension is lowered and moves toward said connection as the extension is raised, and means connected between said pivot connections for The sides 19 and 20 of the links 10 and 11 are notched as indicated at 68 to clear pivots 13 and 14 as seen in Fig. 2.

In the raising and lowering operation attention is called to the fact that the pivot points 15 move toward and away from the diagonally opposed pivot points 12, under influence of the jack 43, and as the gooseneck is raised toward transport position pivot points 15 reach a definite position with respect to pivot points 12 whereat the offset B' is of the proper shape and gooseneck is at the proper level. This position of the parts must be maintained during transport, and for this purpose I provide mechanism for automatically locking jack mechanism 43 against either extension or retraction to maintain the desired definite relationship between points 15 and 12.

Such locking mechanism comprises a pair of hooks 52 and 53 for each jack mechanism 43 and these hooks 52 and 53 are pivotally mounted upon transversely extending pins 54 forming a part of removable mounting blocks 55 which extend into the outwardly opening channels of the respective side bars 47. Bolts 56 secure the blocks in place as best shown in Fig. 5. The hooks 52 and 53 have projecting ends 57 adapted to engage or hook over U-shaped loops or clips 58 secured rigidly to the strut member 39 by means of nuts 59 and extending from the strut member along said upper ends of the side bars 47. The hooks 52 and 53 are so shaped and proportioned that they will thus engage the loops 58 only when the pivot points 15 reach the aforesaid desired definite position with respect to pivot points 12, and obviously when the hooks are thus engaged they will positively prevent any increase in this distance. On the other hand, any decrease in the distance between points 15 and 12 such as might be occasioned by the movement of the arms 10 and 11 repeatedly shown, and desirable positions may be limited not only by the hooks 52 and 53 but primarily by limiting the inward movement of the plunger 50 into the cylinder 44. It will be obvious in this connection that the draft forces transmitted from the gooseneck B to the platform A of the trailer has a tendency to straighten out the offset B' which action is effectively prevented by the hooks 52 and 53 which also take this load and free the jacks thereof, and this tendency is opposed to the tendency of the load to have the opposite effect. It will further be noted that the connection between the pivot points 15 and 12 forms a means for transmitting the draft forces along the more direct line between the gooseneck and the trailer. This is an important feature and relieves the link arms 10 and 11 of any strain brought about by the draft.

The hooks 52 and 53 are automatically operated by the raising and lowering of the supports 24 by means of chains or similar flexible connections 60 and 61. The chains 60 are connected to the lugs 62 formed on the hooks forwardly of their pivots 54, and the opposite ends of said chains 60 are similarly attached to lugs 63 formed on the forward sides of the bearings 26 for the supports 24. The chains 61 are attached at upper ends to rearwardly extending arms 64 on the hooks 52 and 53 and the lower ends of these chains 61 are attached to lugs 65 formed on the rear sides of said bearings 26. The chains 60 and 61 are of such length and are so connected to the hooks and to the bearings 26 that as the supports 24 start to swing downwardly into position for supporting the trailer a pull is exerted by chain 61 downwardly upon the arm 64. This force oscillates the hooks 52 and 53 in the direction indicated by the arrow in Fig. 3 and swings the ends 57 out of engagement with the loops 58. As this occurs the chains 60 are, of course, slacked off to permit such movement by virtue of the upward travel of the lug 63. Thus by the time the supports 24 reach position for supporting the trailer the hooks have been disengaged to permit the extension of the jack mechanism 43 for lowering the gooseneck B. As the gooseneck B is again raised the loops 58 return to positions for engaging the hooks 52 and 53 and in so doing cam over angularly shaped ends 66 of the hooks to swing them back out of the way until the ends 57 may re-engage the loops. The hooks may thus re-engage themselves of their own weight, but in any event as the supports 24 are raised to place the trailer in condition for transport the chains 61 will be slacked off and a pull will be exerted upon the chain 60 to pull the hooks downwardly and forwardly and positively hold them in locking engagement with the loops 58. This condition is illustrated in Fig. 3. A finger 67 may be secured to each block 55 and arranged to overlie each hook 52 and 53 to limit the swinging movements in both directions. Such fingers 57 are so located as to prevent the hooks from swinging too far in either direction while the chains are slack in the lowered position of the gooseneck as indicated in Fig. 4.

It will be understood that I may employ any form of extensible and retractable operating means between the pivot points 15 and 12 in lieu of the hydraulic jacks here shown and I do not wish to limit myself to the use of hydraulic apparatus for this purpose.

It is understood that suitable modifications may be made in the construction and details of the machine as thus described, without departing from the spirit and scope of the appended claims. Having now therefore fully disclosed my invention what I claim to be new and desire to protect by Letters Patent is:

1. A trailer structure of the character described, comprising an offset portion joining the main portion of the trailer to a forwardly extending portion adapted to be secured to a towing unit, the said offset portion being swingably connected to the trailer and said forwardly extending portion whereby the latter may be lowered to act as a loading ramp when the towing unit is removed, and connecting means extending between the said forwardly extending portion and the trailer for transmitting draft forces thereto along a line extending angularly with respect to said offset portion.

2. In a trailer structure of the character described and including a gooseneck extension joined to the forward end of the trailer by an offset portion and adapted to be attached to a towing unit, swingable frame members forming said offset portion and pivotally attached at their ends between the forward end of the trailer and rear end of said gooseneck extension in such manner that said extension may be lowered from an elevated transport position to the ground to act as a loading ramp, and means connecting the said frame members for locking them against swinging movements in transport position and for transmitting draft forces from a lower rear point on the gooseneck extension in the most direct path to an upper forward point on the trailer.

3. In a trailer structure of the character described and including a gooseneck extension bringing them to a definite spacing and maintaining them thereat in the elevated transport position of the said extension.

12. The combination with a trailer having a forward extension adapted to be raised and lowered, of a swingable offset structure for connecting the trailer and extension, comprising arms pivotally connected at their ends to and between said extension and trailer to swing in upright planes with respect to the latter and raise and lower said extension, the arms being so positioned that a pivot connection of one moves away from a pivot connection of the other as the extension is raised, means connected between said pivot connections for bringing them to a definite spacing and maintaining them thereat in the elevated transport position of the extension, and means separate from said last mentioned means for locking the pivot connections against spreading movement for transmitting draft to the trailer.

13. The combination with a trailer having a gooseneck forward extension adapted to be raised and lowered, of a swingable offset structure for connecting the trailer and extension, comprising arms pivotally connected at their ends to and between said extension and trailer to swing in upright planes with respect to the latter and raise and lower said extension, the arms being so arranged that a pivot connection of one moves away from a pivot connection of the other as the extension is lowered and moves toward said connection as the extension is raised, longitudinally extensible and retractable means connected between the said pivot connections, and hook means operative to lock said means against extension while the gooseneck extension is in a raised position.

14. The combination with a trailer having a gooseneck extension adapted to be raised and lowered and to be normally connected and supported when raised by a towing unit, of a swingable offset structure for supporting said extension from the trailer and comprising arms pivotally connected to and between the extension and trailer, said pivot connections being so arranged that the connection of one arm to said extension moves away from a connection of the other arm to the trailer as the extension is lowered, and vice versa, extensible and retractable power means connected between said pivot connections, releasable hook means operative to lock said power means against extension while the gooseneck extension is raised, swingable support means connected to the trailer and adapted to be lowered into ground engaging relation prior to lowering said gooseneck extension, and means operated in response to lowering said support means for automatically releasing said hook means to permit extension of the said power means.

15. The combination with a trailer having a gooseneck extension adapted to be raised and lowered and to be normally connected and supported when raised by a towing unit, of a swingable offset structure for supporting said extension from the trailer, including an extensible and retractable operating mechanism adapted to raise and lower the said extension, locking means for releasably locking said operating mechanism against movement in the raised position of said extension, support means on the trailer movable from a transport position to a trailer supporting position, and means operative by movement of said support means to said trailer supporting position for releasing said locking means.

16. The combination with a trailer having a gooseneck extension adapted to be raised and lowered and to be normally connected and supported when raised by a towing unit, of a swingable offset structure for supporting said extension from the trailer, including an extensible and retractable operating mechanism adapted to raise and lower the said extension, locking means for releasably locking said operating mechanism against movement in the raised position of said extension, support means on the trailer movable from a transport position to a trailer supporting position, means operative by movement of said support means to said trailer supporting position for releasing said locking means, and means operative on return of said supporting means to transport position for reengaging said locking means.

ROY C. TOWNSEND.